United States Patent
DeRaspe-Bolles et al.

(10) Patent No.: US 6,966,277 B2
(45) Date of Patent: Nov. 22, 2005

(54) RECONFIGURABLE MODULAR PLAY AND EXERCISE STRUCTURE FOR ANIMALS

(75) Inventors: Monica DeRaspe-Bolles, Sammamish, WA (US); Barry G. Moore, Sammamish, WA (US)

(73) Assignee: Epoch Design, LLC, Redmond, WA (US)

(*) Notice: Subject to any disclaimer, the term of this patent is extended or adjusted under 35 U.S.C. 154(b) by 0 days.

(21) Appl. No.: 10/420,484

(22) Filed: Apr. 21, 2003

(65) Prior Publication Data

US 2003/0192486 A1    Oct. 16, 2003

Related U.S. Application Data

(63) Continuation-in-part of application No. 09/872,231, filed on May 31, 2001, now abandoned.

(51) Int. Cl.[7] .......................................... A01K 29/00
(52) U.S. Cl. ..................... 119/706; 119/702
(58) Field of Search ..................... 119/702, 706, 705; D30/108, 112, 117, 118, 119, 160

(56) References Cited

U.S. PATENT DOCUMENTS

| | | |
|---|---|---|
| 3,742,870 A * | 7/1973 | Gusdorf et al. ............ 108/150 |
| 3,993,027 A | 11/1976 | Mullin |
| 4,253,423 A | 3/1981 | Kaplan |
| 4,261,136 A * | 4/1981 | Tsui ........................ 446/238 |
| 4,517,922 A | 5/1985 | Lind |
| 4,577,590 A * | 3/1986 | Skroch ....................... 119/706 |
| 4,722,299 A | 2/1988 | Mohr |
| 4,782,616 A * | 11/1988 | Hambleton ..................... 43/1 |
| 4,790,265 A | 12/1988 | Manson |
| 5,050,536 A | 9/1991 | Baker |
| 5,067,440 A | 11/1991 | Hatten et al. |
| 5,161,561 A * | 11/1992 | Jamieson ..................... 135/16 |
| 5,275,127 A | 1/1994 | Leopold |
| D348,124 S | 6/1994 | O'Rourke et al. |
| 5,575,241 A | 11/1996 | Line |
| 5,577,465 A | 11/1996 | Cook |
| 5,577,466 A | 11/1996 | Luxford |
| 5,595,141 A | 1/1997 | Udelle et al. |
| 5,713,306 A | 2/1998 | Johnson |
| 5,755,184 A | 5/1998 | Neidenberger |

(Continued)

*Primary Examiner*—Teri Pham Luu
*Assistant Examiner*—Kimberly S. Smith
(74) *Attorney, Agent, or Firm*—Black Lowe & Graham PLLC

(57) ABSTRACT

A reconfigurable modular play structure for animals including a base, a plurality of cylindrical support members, and one or more platforms to support an animal. The cylindrical support members are helically wrapped with a plurality of flexible line wrappings, allowing different colors and types of wrappings to be used in combination. Special access apertures and holes facilitate locking the line wrappings to the support members. One or more of the platforms or an upper portion of the structure may be rotated on a rotating connection. The structure may also include one or more play members held by an open spring or a soft flexible material playhouse for the entertainment of an animal.

18 Claims, 10 Drawing Sheets

U.S. PATENT DOCUMENTS

| | | |
|---|---|---|
| 5,775,263 A | 7/1998 | Richards |
| 5,806,464 A | 9/1998 | Willinger |
| D406,678 S | 3/1999 | Rittenhouse |
| 5,875,735 A | 3/1999 | Bradley et al. |
| 5,884,586 A | 3/1999 | Carbonelli |
| 5,924,387 A * | 7/1999 | Schramer .................... 119/708 |
| D422,754 S | 4/2000 | Kolozsvari et al. |
| 6,058,887 A | 5/2000 | Silverman |
| 6,082,269 A * | 7/2000 | Padberg ...................... 108/44 |
| 6,209,491 B1 | 4/2001 | Olson |

* cited by examiner

RECONFIGURABLE MODULAR PLAY AND EXERCISE STRUCTURE FOR ANIMALS

PRIORITY CLAIM

This application is a continuation-in-part of U.S. patent application Ser. No. 09/872,231, filed May 31, 2001 now abandoned.

FIELD OF THE INVENTION

This invention relates generally to play and exercise structures for animals.

BACKGROUND OF THE INVENTION

Cats and other pets enjoy climbing and elevated places where they can rest and observe goings on in their surroundings. Cats and other pets also enjoy and benefit from exercise involving movable objects and spaces that spark their natural curiosity and stalking and pouncing instincts, as well as provide them an opportunity to sharpen their claws.

A variety of structures and devices has been made for cats and other pets to satisfy these needs and instincts. Typical pet structures and devices for this purpose, however, are either very large and cumbersome, or limited to small scratching devices. Large freestanding animal structures, often constructed of wood with carpet covering, consist of long and heavy sidepieces. These large structures are cumbersome both for the pet owner to assemble and maintain, as well as for the retailer to acquire and stock for sale, especially given commercial limitations in the display space available in typical retail stores and outlets. Scratching and climbing structures and devices for pets have also been designed to attach to walls. Again, however, such devices are often large and cumbersome, and increase assembly complexity by requiring the pet owner to install wall fasteners and attach the device to a wall.

Attempts at workable animal structures have also suffered from a lack of flexibility in their configuration. Various attempts have been made to increase the flexibility and ease of use of such structures using detachable elements. Such attempts have been largely unsuccessful, however, due to manufacturing costs and design deficiencies.

Cats and other animals also enjoy and benefit from playing with paper bags and other flexible containers. Pet toys or attractive small objects or assemblages have often been hung by cord from pet structures and scratching devices. These accessories suffer from failure from use of the support cord, and shredding of the pet toy, often a toy mouse, with use. A more durably attached and durable in use accessory to an animal structure and scratching device would be desirable and useful. In addition, attractive assemblages that could function both as toys and yet be sufficiently rigid and durable to support an animal's weight for climbing purposes would be beneficial.

Current play structures and perches provide only rigid structures and areas, rather than flexible ones that can be pushed through by the animal.

There is a need for a modular, reconfigurable structure that is attractive to and usable by cats and other small animals, while providing ease of assembly, storage and maintenance both to pet owners and retailers.

SUMMARY OF THE INVENTION

In accordance with the present invention, a modular, reconfigurable animal play and scratching structure is described. The present invention comprises a base member that rests upon a supporting surface and one or more cylindrical support members supporting one or more stationary or rotating platforms.

In accordance with further aspects of the invention, one or more of the platforms may be rotated after assembly through the use of swivel bearings above and below the platform. In a varied aspect of the invention, a rotating connector is used only below a platform to allow the entire portion of the play structure above the rotating connector to be rotated after assembly.

In accordance with other aspects of the invention, the cylindrical support members are multiple spirally wrapped with flexible line wrappings for animal scratching and climbing.

In accordance with still further aspects of the invention, both ends of the cylindrical support member have holes to anchor the ends of the multiple flexible line wrappings, which are spirally wrapped in parallel to cover the cylindrical structure member, as well as to provide color flexibility and a barber pole effect.

In accordance with still another aspect of the invention, the cylindrical support members at one or both ends are fitted with disk-shaped cheek plates that retain the flexible line wrappings close-wound around the cylindrical support member. In an alternative embodiment, the cylindrical support member cheek plates have one or more access apertures that permit access to the ends of the flexible line wrappings anchored through the holes at the ends of the cylindrical support members, facilitating locking the flexible line in place to prevent the ends from coming out of the holes through the support cylinders. In varying embodiments, locking the flexible line in place is done with knots, clamps or clips.

In accordance with yet another aspect of the invention, one or more of the supporting platforms is specially shaped, such as scalloped disc shaped, paddle-shaped, fish-shaped, or dog bone-shaped.

In accordance with yet another aspect of the invention, two platforms are assembled with a cylindrical support member, one above another, and an enclosed area defining a playhouse is created by hanging a soft flexible material from the upper platform toward the lower platform. In varying embodiments, the soft flexible material may be plastic or fabric pieces or strips. In accordance with yet a further aspect of the invention, the fabric playhouse is configured to have one or more door-shaped openings. In an alternative embodiment, the playhouse materials are hung from a platform situated immediately above the base, and the enclosed area is between the platform and the base.

In accordance with a further aspect of the invention, a shaped play member is attached to one of the cylindrical support members or platforms via a spring. The spring and play member projects outward from the support members or down from the platforms. The play member will then bounce when the cat or other small animal bats at it. In other aspects of the invention, the play member is a ball and is covered with a shaggy carpet material. In yet an alternative embodiment, the spring holding the shaped play member supports the play member outward and up from the side of the support members and is sufficiently rigid and durable to support a small animal's weight for climbing purposes.

As will be readily appreciated from the foregoing summary, the invention includes small modular sections for an animal play structure that provides durability and flexibility in configuration after assembly. It further provides optional elements including rotating platforms, specially shaped platforms, multiple color choices and color combinations for spiral wrapping of the scratching and support members, an animal playhouse, and shaped play members.

BRIEF DESCRIPTION OF THE DRAWINGS

The many features and advantages of this invention are better understood with reference to the following detailed description, along with the following drawings.

DESCRIPTION OF THE PREFERRED EMBODIMENT

Figure 1:
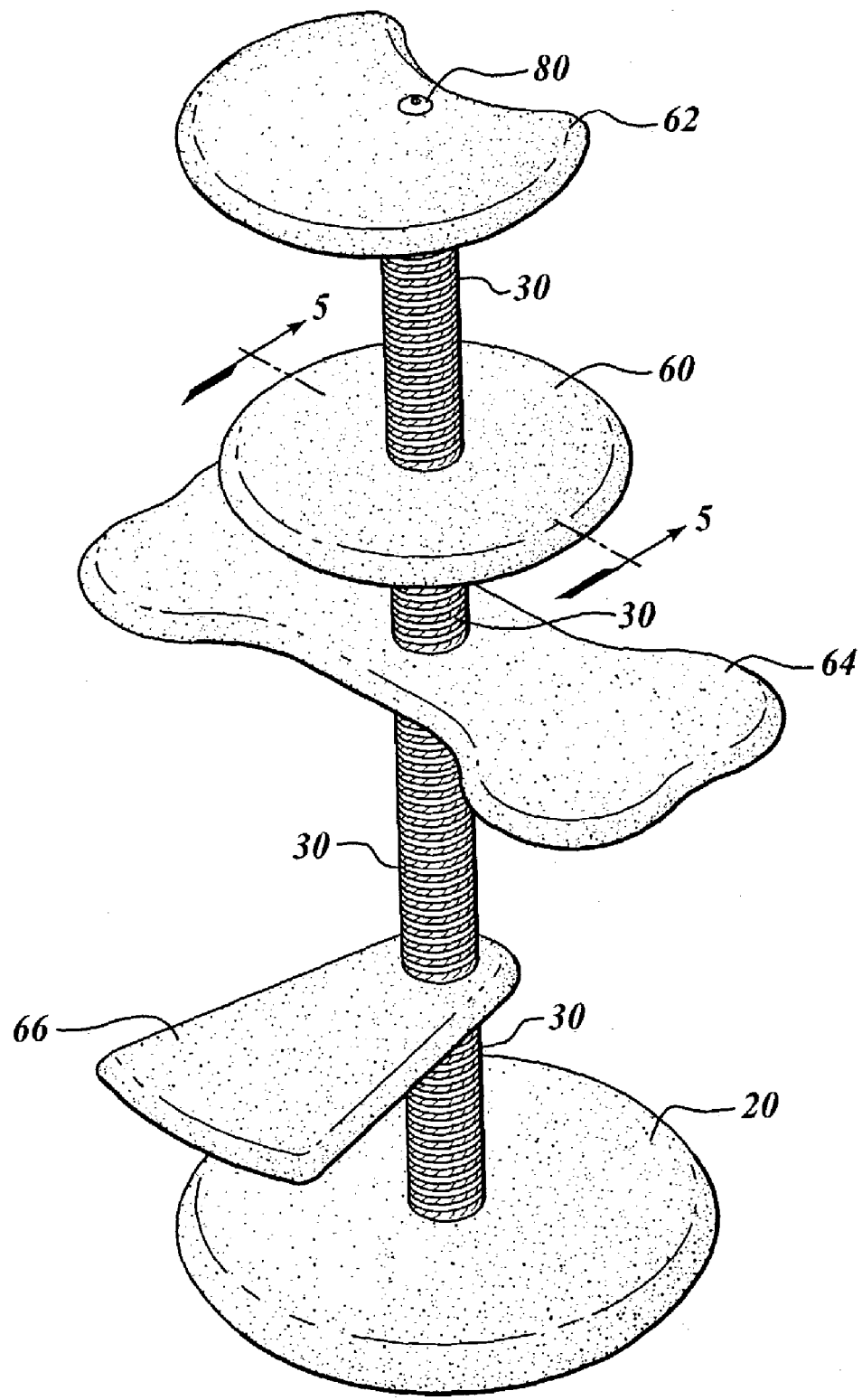
FIG. 1 is an isometric view of a play structure for animals in accordance with the present invention illustrating a plurality of cylindrical support members, a base, a plurality of platforms, multiple spiral flexible line wrappings on the cylindrical support members, and a top fastener.

Referring to FIG. 1, the play structure for animals comprises a base 20 removably fastened to one or more multiple spiral wrapped cylindrical support members 30, and one or more platforms 60. Platforms 60 may be specially shaped. Examples of design variations include paddle shaped 66, dog bone shaped 64, scalloped disk shaped 62, and fish shaped (not shown) platforms. It will be appreciated that while only a limited number of platform designs are shown and described herein, the platforms may be specially shaped to incorporate a virtually limitless number of design variations. The multiple spiral wrapped cylindrical support members are releasably fastened end to end forming a pole with two ends, the lower end fastened to base 20, and the upper end capped with a securing fastener 80.

Figure 2:
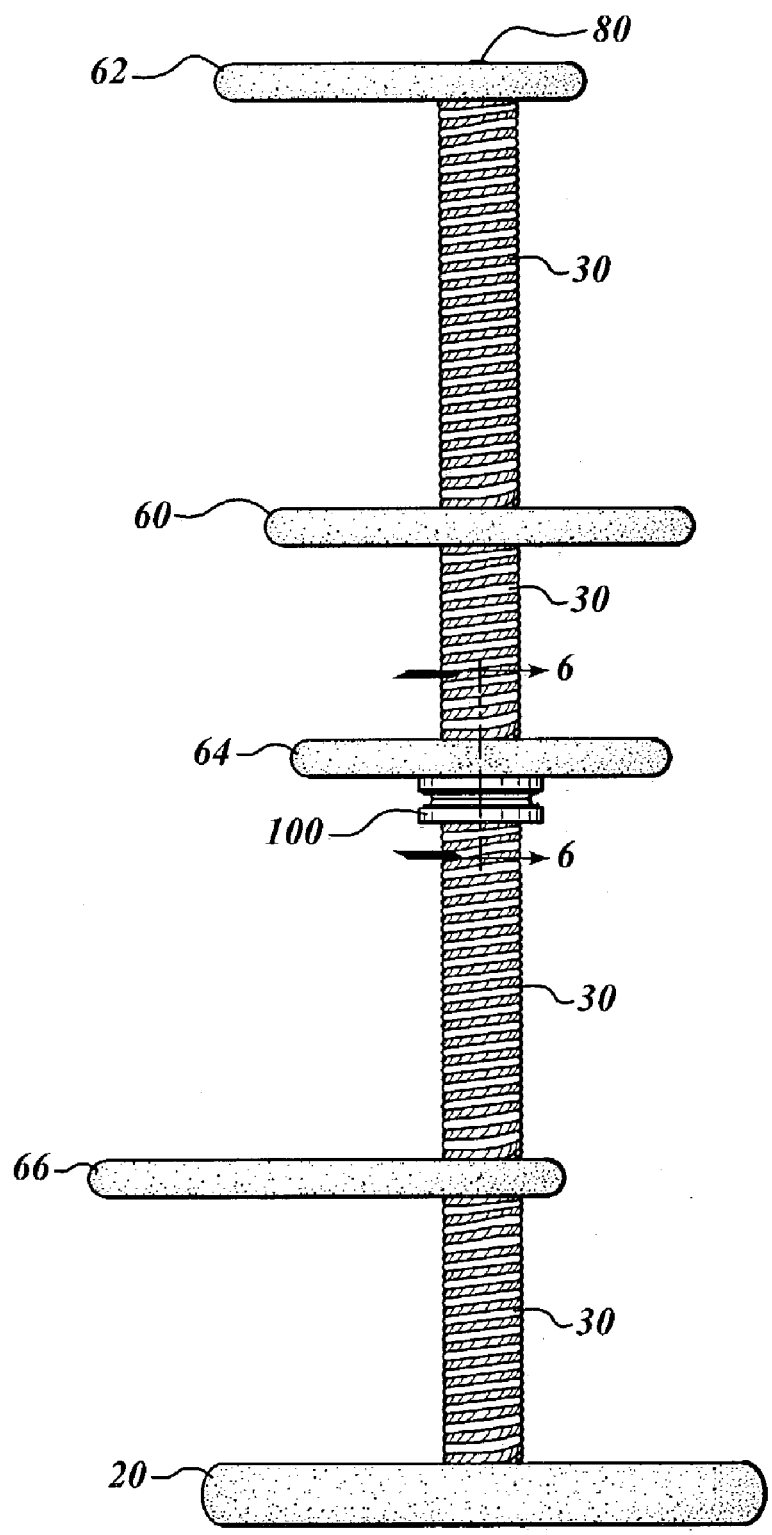
FIG. 2 is a side view of the play structure showing a rotating connector permitting reconfiguration of the structure.

As shown in FIG. 2, an alternate embodiment of the play structure further comprises a rotating connector 100, such as a swivel bearing or other swiveling member or members, releasably connected between an upper end of a multiple spiral wrapped cylindrical support member 30 and a platform 60. The rotating connector permits an upper portion of the animal play structure, above the rotating connector, to be rotatably reconfigured relative to a lower portion of the animal play structure.

Figure 3:
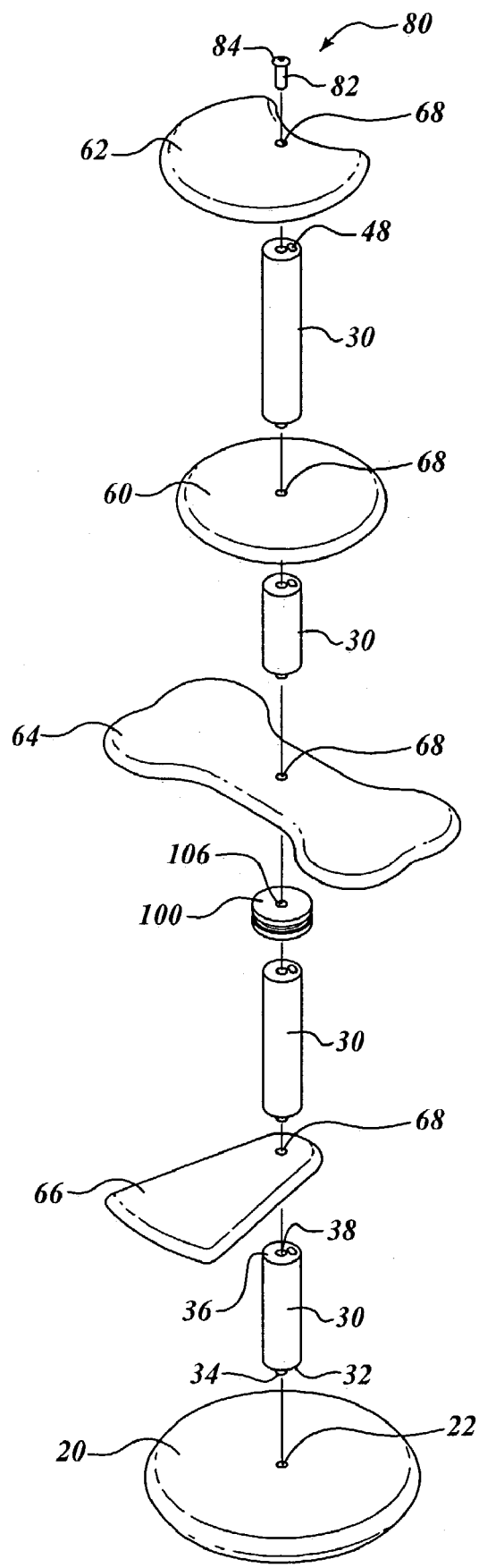
FIG. 3 is an exploded isometric view showing the components of the play structure of FIG. 2.
Figure 4:
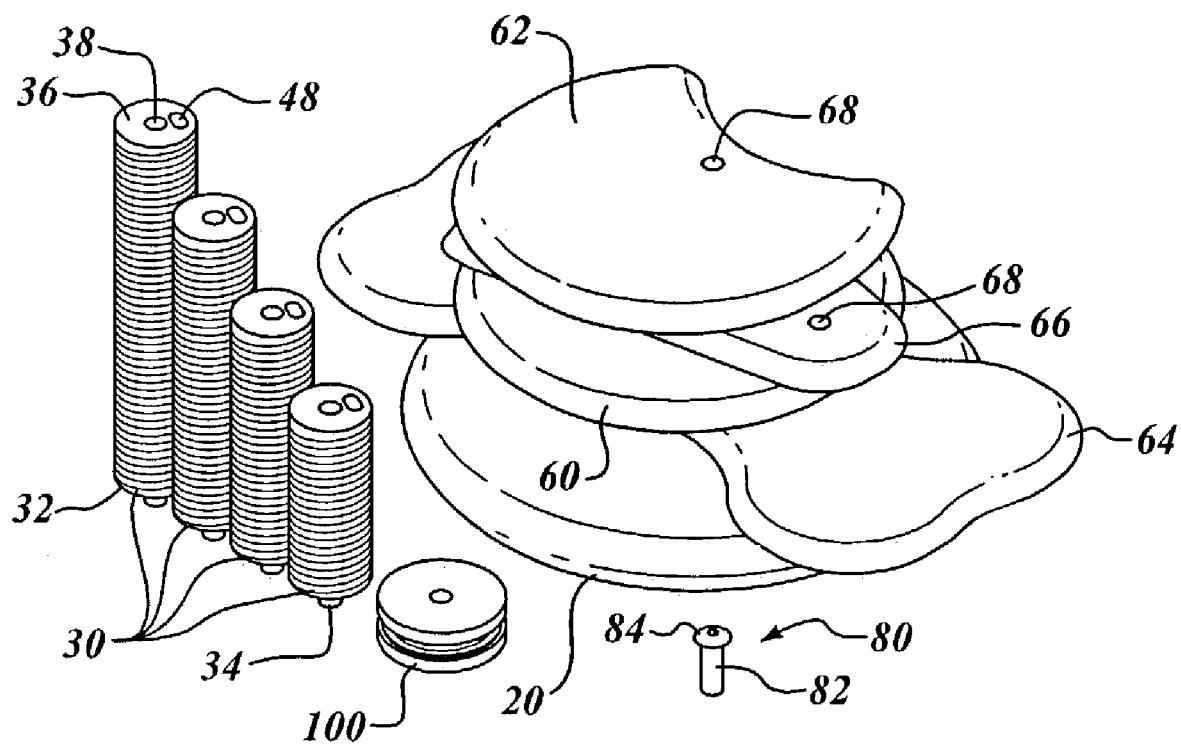
FIG. 4 is an isometric view of the disassembled play structure of FIG. 2 showing the small size of the components closely packed for retailing or storage.

As further shown with reference to FIGS. 3 and 4, the present invention is comprised of small component parts releasably connected to facilitate convenient packing, transportation, retail display and sale, and customer storage. In the preferred embodiment, base 20 includes a female threaded connector 22. Each multiple spiral wrapped cylindrical support member 30 includes affixed end pieces 32 and 36, one located on each end of the support member. A male threaded connector 34 is attached to end piece 32, and a female threaded connector 38 is attached to end piece 36. Male threaded connector 34 is threaded and sized to correspond to and be received by female threaded connector 38 of support member 30, as well as by female threaded connector 22 of base 20. End pieces 32 and 36 further include access apertures 48, described with more particularity below. Platforms 60 include assembly holes 68, sized to allow passage of male threaded connector 34. Alternatively, platforms 60 may include a cutout (not shown) rather than an assembly hole, the cutout sized slightly larger than the diameter of the support member end pieces. This embodiment allows a first support member to pass completely through the platform to join with a second support member or base 20. Rotating connector 100 (see also FIG. 6) comprises a male threaded connector 108 and a female threaded connector 106 threaded and sized to correspond to and be connected with, respectively, female threaded connector 38 and male threaded connector 34 of support members 30. Securing fastener 80 consists of a male threaded portion 82 threaded and sized to correspond to and be received by female threaded connector 38 of support member 30, as well as by female threaded connector 22 of base 20. One end of the securing fastener, designed to be exposed where not threaded into female threaded connector corresponding to the male threaded portion of the securing fastener, further includes a smooth and generally flat or slightly rounded cap 84. The cap may be configured to receive a screwdriver or wrench assembly to allow tightening of the securing fastener in the female threaded connector.

During assembly, for example of the embodiment shown in FIG. 3, male threaded connector 34 of a first support member 30 is threadably inserted into female threaded connector 22 of base 20. Assembly hole 68 of paddle shaped platform 66 is aligned with female threaded connector 38 of first support member 30. Male threaded connector 34 of a second support member 30 is then passed through assembly hole 68 of paddle shaped platform 66 and threadably inserted into female threaded connector 38 of first support member 30. To permit rotatable reconfiguration of the support members and platforms located above this point of the structure, rotating connector 100 is placed between dog bone shaped platform 64 and second support member 30, as described in greater detail below (see FIG. 6). Assembly hole 68 of dog bone shaped platform 64 is aligned with the rotating connector and female threaded connector 38 of second support member 30. Male threaded connector 34 of a third support member 30 is then passed through assembly hole 68 of dog bone shaped platform 64 and into rotating connector 100, which in turn is threadably connected via female threaded connector 38 to second support member 30. This general process is repeated for circular platform 60, a fourth support member 30, and scalloped disk shaped platform 62. The assembled structure is capped by passing male threaded portion 82 of securing fastener 80 through assembly hole 68 of scalloped disk shaped platform 62 and threadably inserting the male threaded portion into the female threaded connector. By tightly connecting male threaded connector 34 with corresponding female threaded connector 38, end pieces 32 and 36 securely engage platform 60. In an alternate embodiment, multiple adjacent support members are threadably connected directly without a sandwiched platform, making a longer pole between other platforms, or the base and a platform.

Referring to FIG. 4, the component parts of the animal play structure are displayed in disassembled isometric form showing the capability of the animal play structure to be packed or stored in a small space. FIG. 4 shows the animal play structure comprising base 20, a plurality of multiple spiral wrapped cylindrical support members 30 each with two opposite end pieces 32 and 36, end piece 32 having male threaded connector 34 and access aperture 48 (not visible) and end piece 36 having female threaded connector 38 and access aperture 48. The structure has a plurality of platforms 60 of various shapes, which include scalloped disk shaped platform 62, paddle shaped platform 66, circular platform 60, and dog bone shaped platform 64. FIG. 4 shows the disassembled and closely packed components of the embodiment shown in FIG. 2, including rotating connector 100, and a securing fastener 80.

Figure 5:
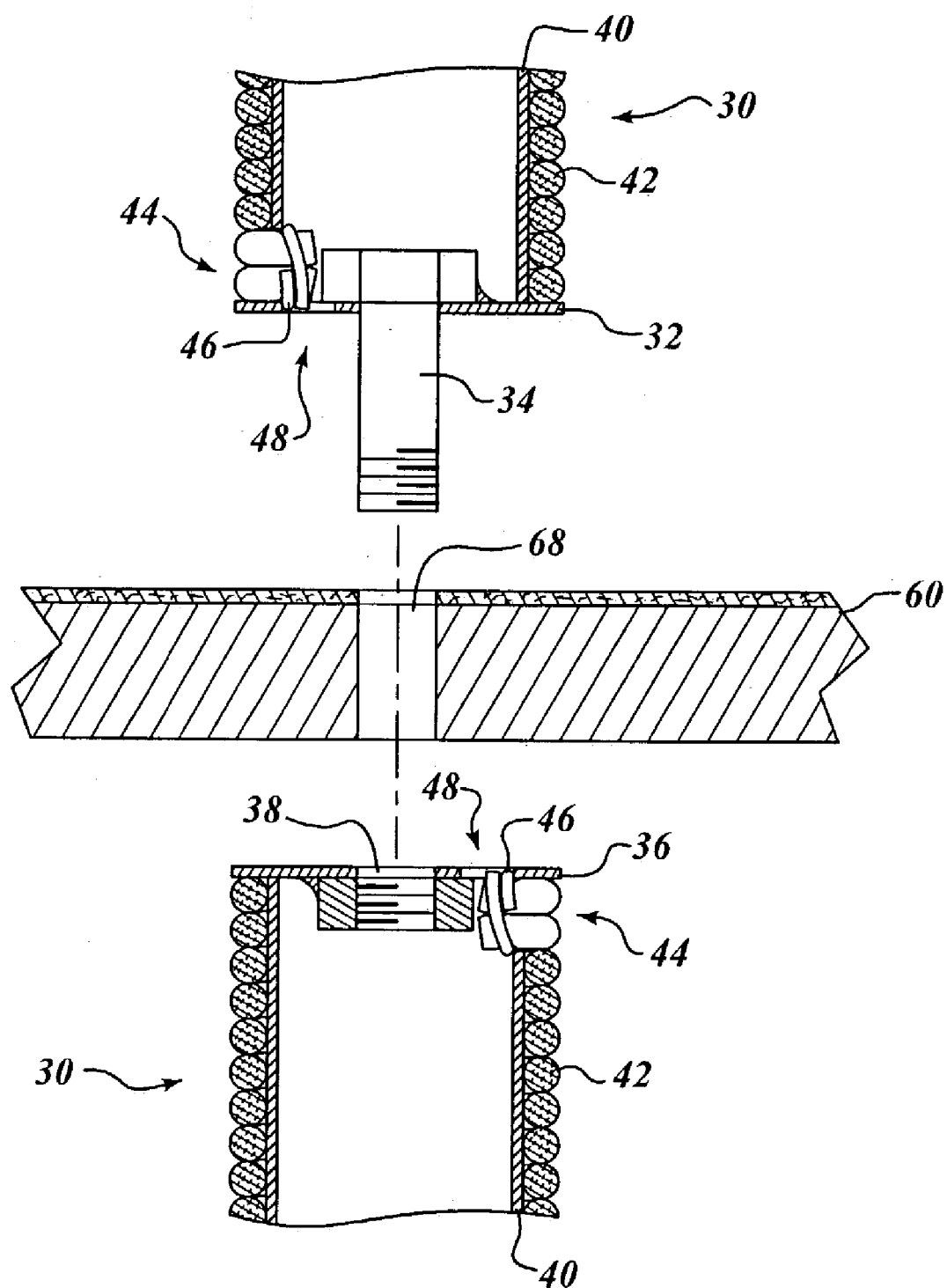
FIG. 5 is an enlarged exploded section taken substantially along the plane of the line 5—5 of FIG. 1.

FIG. 5 is a cross section showing adjacent multiple spiral wrapped cylindrical support members 30 having a platform 60 sandwiched between. Attached at the end of each multiple spiral wrapped cylindrical support member is an end piece 32 or 36, supporting male threaded connector 34 and female threaded connector 38, respectively. In the preferred embodiment, end pieces 32 and 36 are cheek plates, and the male and female threaded connectors are securely mounted to or formed into the cheek plates. As described above, male threaded connector 34 is threaded and sized to correspond to and be received by female threaded connector 38. In the preferred embodiment, the multiple spiral wrapped cylindrical support members are hollow cylinders, preferably made out of metal, having thin walls 40. In alternative embodiments of the invention the support members may be solid, or thick walled, and the end pieces may be integral with the support members.

As shown more particularly with reference to FIG. 5, support members 30 include multiple flexible line wrappings 42. The multiple flexible line wrappings preferably consist of two pieces of rope close-wound around support member wall 40. The ends of the multiple flexible line wrappings project through line holes 44 in the side of support member wall 40 adjacent to the ends of the support member. The flexible line wrappings originate in a first line hole at one end of the support member and are close wound in spiral fashion around the support member wall to the other end of the support member, at which point they are projecting through a second line hole at the other end of the support member. In the preferred embodiment, the flexible line wrappings are locked in place at their ends with a metal fastener 46, which may be crimped through access aperture 48. Other fasteners may be used, including knots, glue, etc. In alternative embodiments of the invention, line hole 44 may take different forms, such as a notch at the ends of the support member or multiple holes or notches, one for each corresponding line wrapping, at different angles around the support member. Line wrappings may also be terminated at different locations along length of the support member.

In the preferred embodiment, the diameter of end pieces 32 and 36 are equal to the diameter of the support member wall 40, plus the diameter of the flexible line wrappings spirally close-wound around the support member wall. In alternative embodiments, the diameter of the end pieces may vary and be less than or greater than the diameter of the support member wall. Increasing the size of the end pieces provides greater support to sandwiched platform 60.

Figure 6:
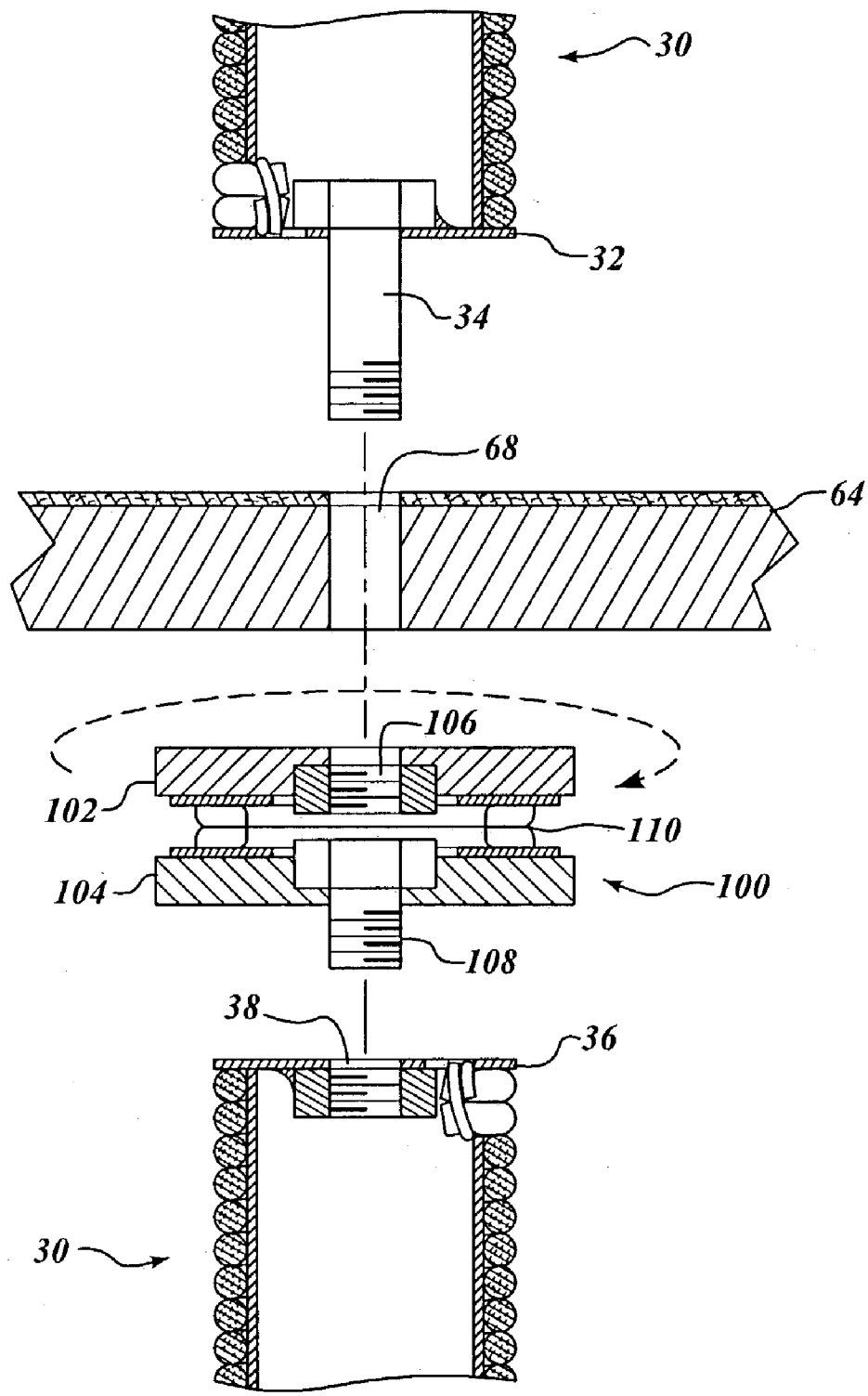
FIG. 6 is an enlarged exploded section taken substantially along the plane of line 6—6 in FIG. 2.

FIG. 6 is an enlarged section taken substantially along the plane of line 6—6 on FIG. 2. This figure shows an alternate embodiment of the animal play structure having a rotating connector 100 that permits an upper portion of the play structure to be rotationally reconfigured relative to a lower portion. Rotating connector 100 includes movable attached but independently rotatable upper and lower swiveling members 102 and 104, respectively. Upper swiveling member 102 has a female threaded connector 106, threaded and sized to receive the male threaded connector 34 of a support member. Lower swiveling member 104 has a male threaded connector 108 threaded and sized to be received by the female threaded connector 38 of a support member. The upper and lower swiveling members rotate on a race of ball bearings 110. Rotating connector 100 preferably has a diameter equal to or larger than the diameters of end pieces 32 and 36 to engage and provide support to the platform or the adjacently attached multiple spiral wrapped cylindrical support members 30.

In assembly, to permit rotatable reconfiguration of the support members and platforms located above this point of the structure, rotating connector 100 is placed between platform 64 and support member 30. More specifically, assembly hole 68 of platform 64 is aligned with female threaded connector 106 of upper swiveling member 102. Male threaded connector 34 of a first supporting member is then passed through assembly hole 68 of platform 64 and threadably connected to female threaded connector 106. Male threaded connector 108 of lower swiveling member 104 is threadably connected to female threaded connector 38 of a second support member. In an alternative embodiment, two multiple spiral wrapped cylindrical support members 30 are attached directly to rotating connector 100 without platform 64 sandwiched in between. In yet an alternative embodiment (not shown), two rotating connectors 100 are used, one adjacent to the top and bottom surfaces of a platform, respectively. In this configuration, the individual platform surrounded by adjacent rotating connectors is rotatable independent of the balance of the structure, and the upper portion of the structure is rotatable independent of the lower portion of the structure.

Figure 7:
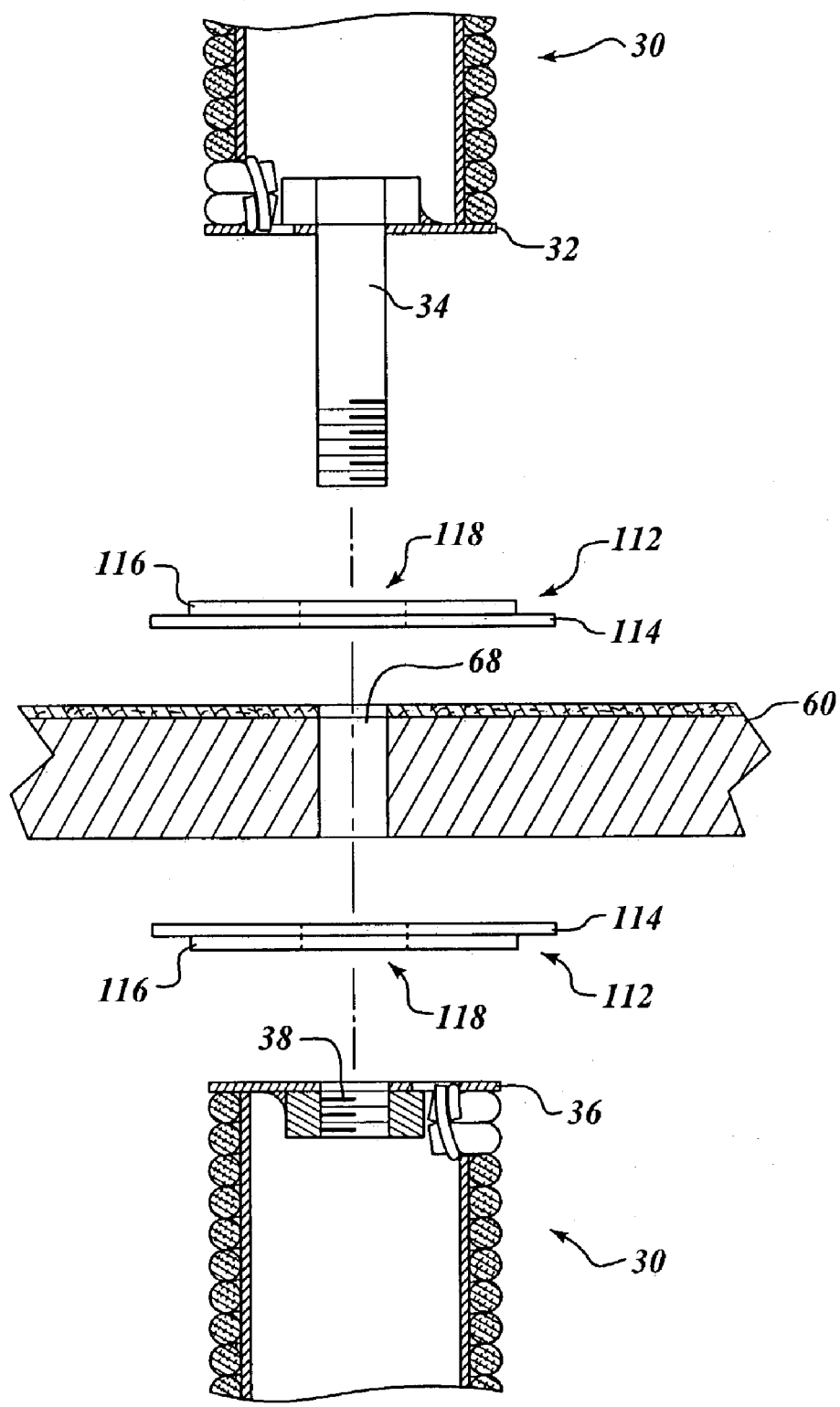
FIG. 7 is an enlarged exploded section of an alternative embodiment of the present invention having two swivel bearings permitting reconfiguration of a single platform of the structure.

FIG. 7 is an enlarged cross section showing an alternate embodiment of the present invention using a different type of rotating connection. In this embodiment, swivel bearings 112 are thin, comprised of a faceplate 114 and a bearing surface 116 in which bearings (not shown) are maintained. Swivel bearing 112 further includes a center aperture 118 sized to allow passage of male threaded connector 34 of support members 30.

In assembly, first and second swivel bearings 112 are placed above and below platform 60 and between first and second support members 30. In this embodiment, assembly hole 68 of platform 60 is aligned with center aperture 118 of both swivel bearings 112. Male threaded connector 34 of a first supporting member is then passed through center aperture 118 of the first swivel bearing, through assembly hole 68 of platform 60 and through center aperture 118 of a the second swivel bearing, to be threadably connected to female threaded connector 38 of the second support member. Inclusion of two swivel bearings, each have independently movable bearings, permits a single platform 60 to be rotationally reconfigured relative to the balance of the animal play structure.

Figure 8:
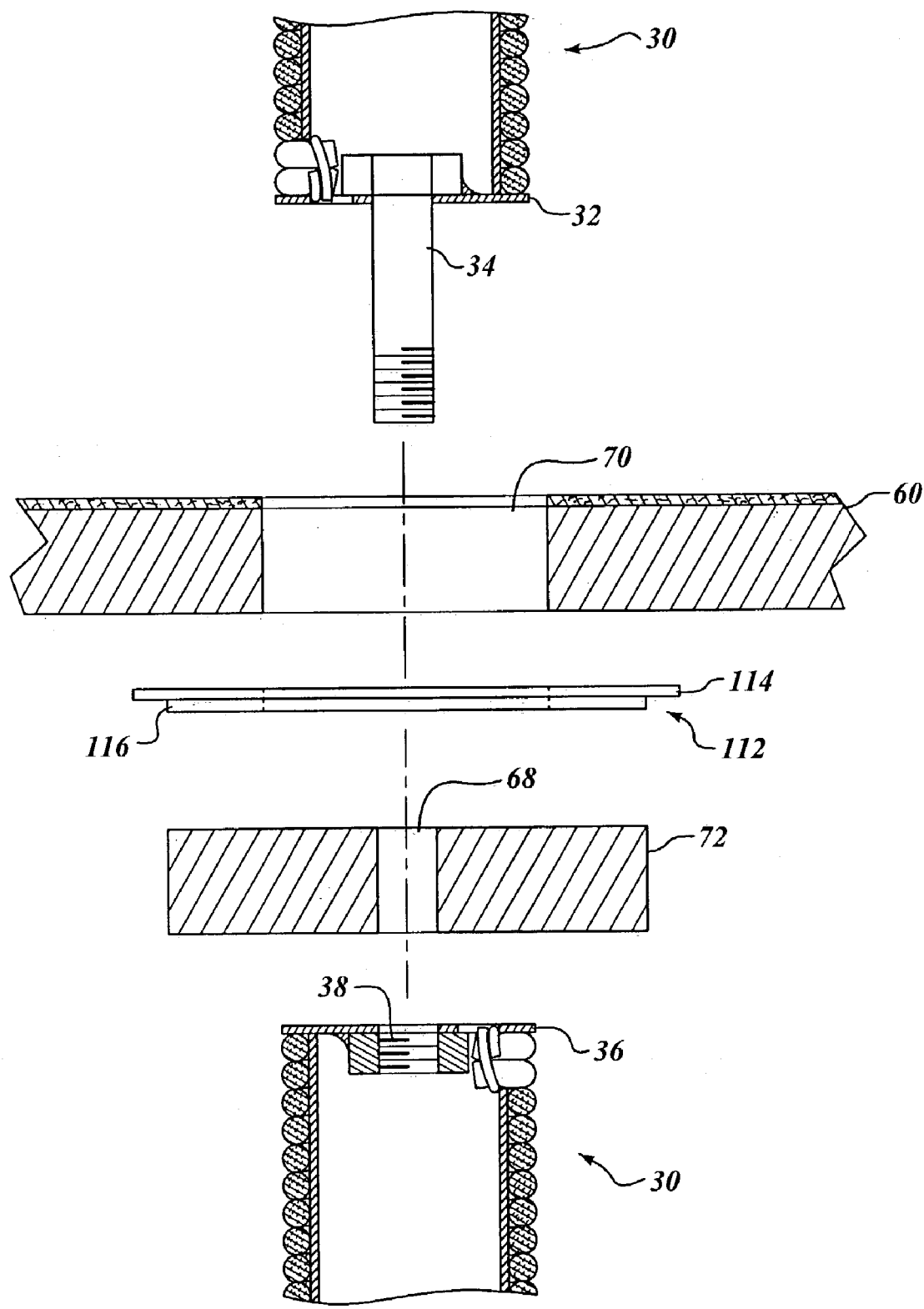
FIG. 8 is an enlarged exploded section of an alternative embodiment of the present invention having a single swivel bearing permitting reconfiguration of a single platform of the structure.

In an alternative embodiment shown with reference to FIG. 8, a swivel bearing assembly is used in association with a platform 60 having a cutout rather than an assembly hole, the cutout sized slightly larger than the diameter of the end piece 32 of the first supporting member, a ring-shaped swivel bearing 112, and an additional support element 72 having an assembly hole 68 sized to allow passage of the male threaded connector. In this embodiment, the additional support element is placed above female threaded connector 38, resting on end piece 36 of the second support member. Bearing surface 116 is attached (permanently or removably) to the additional support element. Faceplate 114 is attached (permanently or removably) to platform 60. The first support member is passed through the cutout in the platform and the ring-shaped swivel bearing so that end piece 36 of the first support member rests on the additional support element. Male threaded connector 34 is passed through platform 60, the ring-shaped swivel bearing, and the additional support element (via the assembly hole) and threadably connected to female threaded connector 38. This embodiment allows only single platform 60 to rotate independent from the balance of the structure. In one variation of this alternative embodiment, the swivel bearing 112 is sized to be supportable directly by the end piece 36 of the second support member. In this example, the bearing surface 116 is attached (permanently or removably) to the end piece 36 and the faceplate 114 is attached (permanently or removably) to platform 60.

Figure 9:
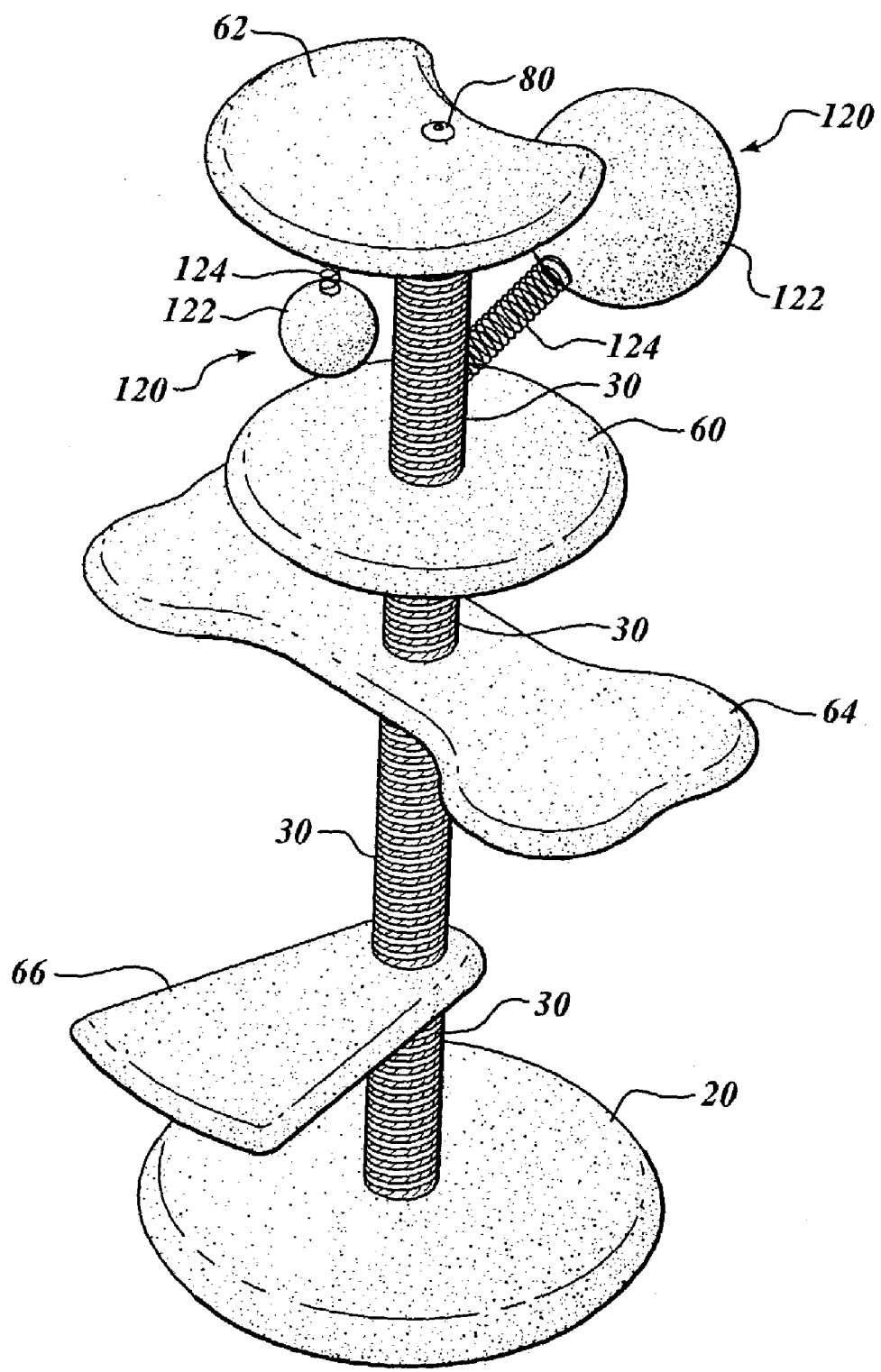
FIG. 9 is an isometric view of the play structure for animals, illustrating a plurality of material-covered shaped play members movably attached to the structure.

FIG. 9 shows an alternative embodiment of the invention including two material covered members 120 attached to the modular play structure for animals. In this embodiment, the members are ball shaped and are covered with a shaggy carpet material. In other embodiments alternative shapes as well as alternate covering materials for scratching or clawing by a cat or other animal may be utilized. In the preferred embodiment, material covered members 120 comprise of a carpet-covered ball 122 removably fastened to one end of an open spring 124. The opposite end of the spring from the ball is removably fastened to multiple spiral wrapped cylindrical support member 30 of the animal play structure. FIG. 8 also shows an alternate embodiment where material covered member 122, such as a ball or other toy or device, is removably fastened to an open spring 124 that is removably fastened to the underside of platform 60 of the animal play structure.

Play member 120 may be fastened to the play structure in a wide variety of ways, either to support members or platforms, as well as at various angles relative to the vertical support members, dependent on the resiliency of spring 124 and the size and weight of ball 122. In an alternative embodiment, the spring 124 holding the ball 122 supports the ball outward and at or above perpendicular from the side of the support members. In this embodiment, the spring is sufficiently rigid and durable to support the weight of a ball of substantial size and bulk. For example, in the preferred embodiment, the ball used has a diameter of six inches and weighs 0.6 pounds. In this embodiment, the spring used to support the ball outward and up from the side of the support members is a heavy duty spring having a lateral spring constant (tested at 20 cm from the end of the spring) of not less than 12 newtons. The spring holding the ball is sufficiently rigid and durable to support an animal's weight for climbing purposes from the base to a platform or between platforms. Different types of springs having different lateral spring constants can be used to support balls of different size and bulk.

Figure 10:
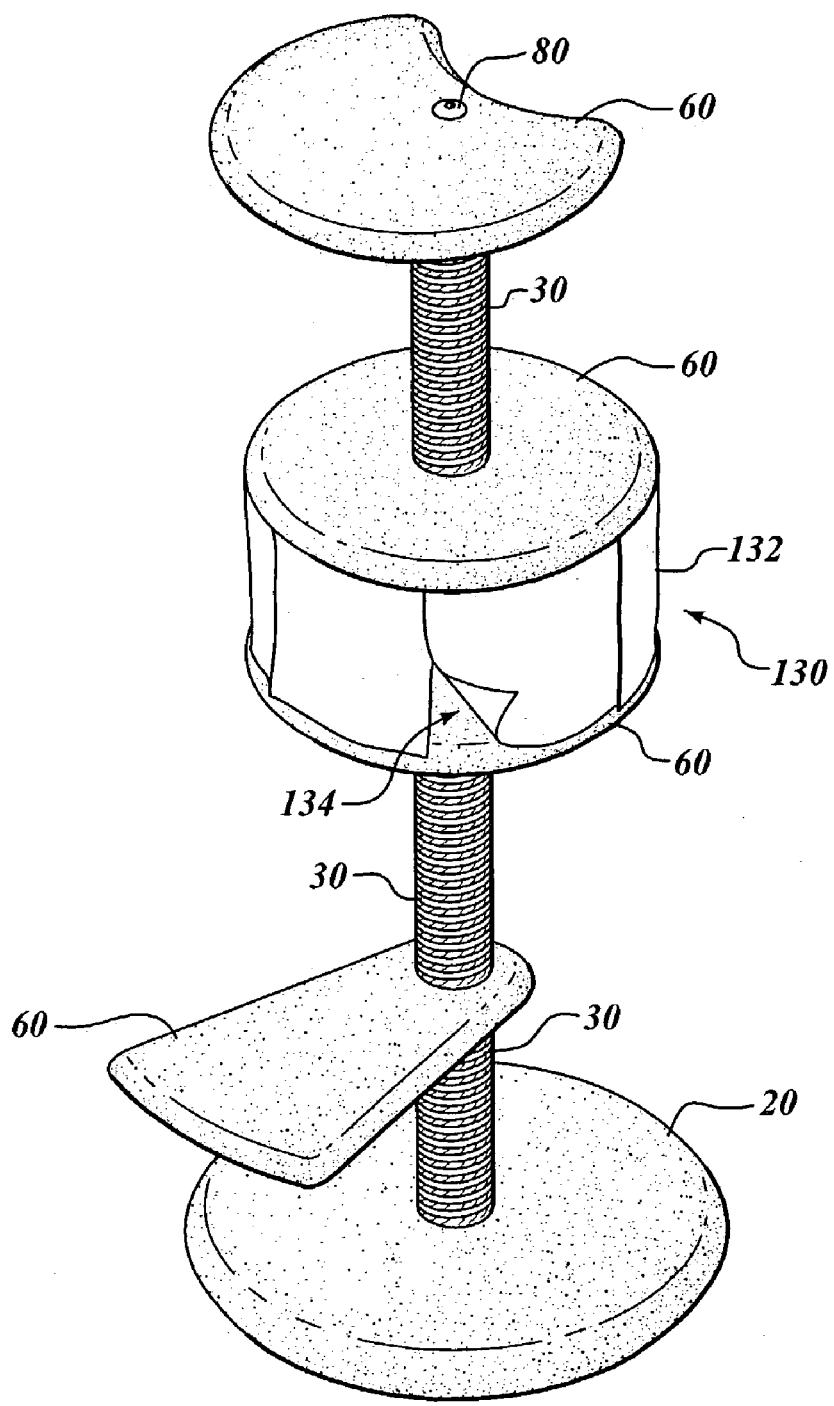
FIG. 10 is an isometric view of the play structure for animals, further showing a soft flexible material playhouse.

FIG. 10 shows an alternate embodiment of the invention with a playhouse 130 for the modular play structure for animals. The playhouse comprises a soft flexible material 132, in one or more pieces, releasably or permanently attached to platform 60 (for instance by Velcro, snaps, string, hooks, nails, glue, etc.) so as to drape or hang down from the supporting platform towards the platform below, forming an enclosed area 134. In an alternate embodiment, playhouse 130 is located on the first platform above base 20 and soft flexible material 132 hangs down from the platform touching or coming near the base. Soft flexible material 132 may consist of strips of any number of various materials, such as fabrics, carpets, leathers, etc. The configuration of the resulting enclosed area may vary based on the flexibility of material 132 used, as well as on the shape of platform 60 to which the material is attached. Ingress and egress paths into the enclosed area may be added, such as an opening shaped like a doorway cut into material 132. This embodiment maximizes the ability of the animal to enter and leave the playhouse area. Because the platform is supported only by a single, centrally located support member, entry through the flexible material forming the playhouse is not obstructed by a support member from any point along the perimeter of the playhouse.

In yet alternative embodiments, different enclosed areas could be defined by either flexible or rigid coverings positioned on or supported by the supporting members, platforms, or the base. The playhouse may also be made with wire or framed with wire, further enclosed by a covering material. For example, a playhouse may be framed above and below by one or more platforms or the base and molded wire spanning between the platform and base. This structure could be enclosed by flexible or semi-rigid materials draped or molded around part or the entire wire frame to create a play enclosure. Ingress and egress paths could be added to this structure.

While the preferred embodiment of the invention has been illustrated and described, as noted above, many changes can be made without departing from the spirit and scope of the invention. For example, the orientation of male and female threaded connectors on the end pieces of the support members may be reversed, the base female threaded connector converted to a male threaded connector, and the securing fastener modified to receive a male threaded connector. This would allow assembly of a comparable structure within the scope of the present invention. Alternately, locking peg and socket connectors could be substituted for threaded connectors. The supporting columns, cylinders in the preferred embodiment herein may also be other shapes in cross section, including square, oval, or rectangular. Materials other than metal may be utilized for the cylindrical support members and platforms, such as wood, plastic, etc. Accordingly, the scope of the invention is not limited by the disclosure of the preferred embodiment.

The embodiments of the invention in which an exclusive property or privilege is claimed are defined as follows:

1. A modular play structure for animals, positionable upon a support surface, comprising:
    a base engageable with the support surface;
    at least one freestanding elongated support member having an upper end and a lower end and a vertical side extending there between, the support member helically wrapped with at least one flexible line wrapping close-wound around the support member between its upper and lower ends, the lower end of the support member being removably attached to the base; and at least one platform removably attached to the upper end of the at least one support member, and a rotating connector coupled between said at least one platform and said at least one support member, said rotating connector allowing said platform to rotate independently relative to the base when the play structure is in use by an animal.

2. The modular play structure of claim 1, wherein the lower end of the at least one elongated support member is removably attached to the base with threaded connectors.

3. The modular play structure of claim 1, wherein the upper end of the at least one elongated support member is removably attached to the at least one platform with threaded connectors.

4. The modular play structure of claim 1, wherein the support member is helically wrapped with a plurality of flexible line wrappings close wound around the support member, the plurality of flexible line wrappings comprising alternating types of rope.

5. The modular play structure of claim 4, wherein the elongated support member is a thin-walled cylinder, the thin walled cylinder has at least one hole at the upper and lower ends, and where the plurality of flexible line wrappings close-wound around the elongated support member are threaded through the holes at the upper and lower ends of the thin-walled cylinder and held inside the elongated support member.

6. The modular play structure of claim 5, wherein the elongated support member further comprises two disk-shaped cheek plates, each with a center and a perimeter, attached to each of the opposite ends of the thin-walled cylinder, each cheek plate having a diameter equal to or greater than the diameter of the thin-walled cylinder plus the diameter of the flexible line wrappings helically close-wound around the elongated support member, the cheek plates penetrated by one or more access apertures located away from the center of the cheek plate, and inside the perimeter of the cheek plate, allowing access to the ends of the flexible line wrappings threaded through the holes at the ends of the thin-walled cylinder for holding the flexible line wrappings to the thin-walled cylinder.

7. The modular play structure of claim 1, further comprising a material covered member removably fastened on one end of an open spring, the open spring having another end away from the material covered member removably fastened to the vertical side extending between the upper end and lower end of the elongated support member of the modular play structure, the material covered member pointing upward and away from the vertical side extending between the upper end and lower end of the elongated support member.

8. The modular play structure of claim 7, wherein the spring is of sufficient rigidity to support the weight of an animal using the structure on the material covered member.

9. The modular play structure of claim 7, wherein the open spring has a lateral spring constant of not less than 12 newtons.

10. The modular play structure of claim 1, further comprising a playhouse having one or more pieces of soft flexible material attached to the platform hanging from the outside shape of the platform extending downward towards the base and forming a substantially enclosed area.

11. The modular play structure of claim 10, further comprising a doorway shaped aperture in the soft flexible material.

12. A modular play structure for animals, positionable upon a support surface, comprising:

a base engageable with the support surface;

a first elongated support member extending above the base having an upper end and a lower end, the support member helically wrapped with at least one flexible line wrapping close-wound around the cylindrical support member between its upper and lower ends;

a second elongated support member extending above the first elongated support member having an upper end and a lower end, the support member helically wrapped with at least one flexible line wrapping close-wound around the cylindrical support member between its upper and lower ends;

a platform removably attached between the first and second elongated support members; and an upper swivel bearing removably fastened immediately above the platform and a lower swivel bearing removably fastened immediately below the platform, permitting the platform to rotate when assembled.

13. A play structure for animals, positionable upon a support surface, comprising:

a base engageable with the support surface;

a first elongated support member having an upper end and a lower end, the lower end of the support member attached to the base to hold the support member above the base, the first elongated support member being at least partially helically wrapped with a flexible line wrapping;

a first platform attached to the upper end of the support member;

a second elongated support member having an upper end and a lower end, the lower end being coupled to the first platform; and a first swivel connector coupled between the base first elongated support member and the first platform, the swivel connector allowing the first platform to rotate independently relative to the base when the play structure is in use by an animal.

14. A modular play structure for animals, positionable upon a support surface, comprising:

a base engageable with the support surface;

a plurality of elongated support members having an upper end and a lower end, the support members helically wrapped with a plurality of flexible line wrapping close-wound around the support members between their upper and lower ends, the support members being removably attached to each other end to end to form a column with a top and bottom end, the bottom end of the column being removably attached to the base to hold the support members above the base;

a platform removably attached to the upper end of at least one support member; and a rotating connector releasably attached to the platform to permit the platform to rotate independently of said base.

15. A modular play structure for animals, positionable upon a support surface, comprising:

a base engageable with the support surface;

a first elongated support extending above the base having an upper end surface positioned transverse to the vertical axis and a lower end;

a swivel support having a top side and a bottom side, the bottom side attached to the upper end surface of the first elongated support;

a platform having a top side and a bottom side and a cutout substantially through its center;

a rotating connector sandwiched between the top side of the swivel support and the bottom side of the platform; and a second elongated support member having an upper end and a lower end, the lower end of the second support member passing through the cutout in the platform to attach to the first support member via the swivel support, wherein the platform is permitted to rotate independently from the base when the play structure is in use by an animal.

16. A modular play structure for animals, positionable upon a support surface, comprising:

a base engageable with the support surface;

a first support extending above the base having an upper end and a lower end;

a platform having a top side and a bottom side and a cutout substantially through its center;

a rotating connector between the upper end of the first support and the bottom side of the platform;

a second support member having an upper end and a lower end, the lower end of the second support member passing through the cutout in the platform to attach to the first support member, wherein the platform is permitted to rotate independently from the base when the play structure is in use by an animal; and wherein at least one support member is helically wrapped with a flexible line wrapping close-wound around the support member between its upper and lower ends.

17. The play structure of claim 16, where the rotating connector is a swivel bearing.

18. A modular play structure for animals, positionable upon a support surface, comprising:

a base engageable with the support surface;

a plurality of elongated support members having an upper end and a lower end, the support members helically wrapped with a plurality of flexible line wrapping close-wound around the support members between their upper and lower ends, the support members being removably attached to each other end to end to form a column with a top and bottom end, the bottom end of the column being removably attached to the base to hold the support members perpendicular to the base;

a plurality of platforms removably attached to the upper ends of support members;

an upper swivel bearing removably fastened immediately above one platform and a lower swivel bearing removably fastened immediately below the platform, permitting the platform to rotate independent of the balance of the structure;

a playhouse comprising one or more pieces of soft flexible material attached to a platform hanging from the platform extending downward towards the base or a lower platform, forming an enclosed area surrounded by the soft flexible material; and a material covered member removably fastened on one end of an open spring, the open spring having another end away from the material covered member removably fastened to the modular play structure.

* * * * *